(12) United States Patent  
Kuramochi

(10) Patent No.: US 10,429,896 B2  
(45) Date of Patent: Oct. 1, 2019

(54) OPENING AND CLOSING DEVICE AND TERMINAL DEVICE

(71) Applicant: KEM HONGKONG LIMITED, Tsimshatsui Kowloon (HK)

(72) Inventor: Ryuta Kuramochi, Kanagawa (JP)

(73) Assignee: KEM HONGKONG LIMITED, Tsimshatsui Kowloon (HK)

( * ) Notice: Subject to any disclaimer, the term of this patent is extended or adjusted under 35 U.S.C. 154(b) by 0 days.

(21) Appl. No.: 16/126,780

(22) Filed: Sep. 10, 2018

(65) Prior Publication Data

US 2019/0086965 A1 Mar. 21, 2019

(30) Foreign Application Priority Data

Sep. 21, 2017 (JP) ................................. 2017-181060

(51) Int. Cl.
*G06F 1/16* (2006.01)

(52) U.S. Cl.
CPC .......... *G06F 1/1652* (2013.01); *G06F 1/1616* (2013.01); *G06F 1/1681* (2013.01)

(58) Field of Classification Search
CPC ..... G06F 1/1626; G06F 1/1652; G06F 1/1681
USPC ............... 361/679.26, 679.3, 679.55, 679.56
See application file for complete search history.

(56) References Cited

U.S. PATENT DOCUMENTS

| | | | |
|---|---|---|---|
| 10,120,421 B1 * | 11/2018 | Hong | G06F 1/1681 |
| 2013/0010405 A1 * | 1/2013 | Rothkopf | H04M 1/0216 361/679.01 |
| 2016/0132075 A1 * | 5/2016 | Tazbaz | G06F 1/1681 361/679.27 |
| 2018/0044958 A1 * | 2/2018 | Tazbaz | E05D 3/12 |
| 2018/0059734 A1 * | 3/2018 | Knoppert | G06F 1/1681 |
| 2018/0224897 A1 * | 8/2018 | Tucker | E05D 1/06 |

FOREIGN PATENT DOCUMENTS

JP 2014161009 A 9/2014

* cited by examiner

*Primary Examiner* — Anthony Q Edwards
(74) *Attorney, Agent, or Firm* — Notaro, Michalos & Zaccaria P.C.

(57) ABSTRACT

An opening and closing unit which satisfies required functions of an opening and closing unit and is able to more smoothly bend/unfold a terminal, link parts are slidable with rotation relative to an attaching member. Link parts are slidable with rotation relative to an attaching member. Central parts are provided between the link members and the link parts, with one end portion thereof being slidable relative to the link members with rotation, and other end portion thereof being slidable relative to the link parts with rotation. The friction generating portions are provided between an attaching part and central parts, and apply a resistance force against a rotation of the central members relative to the attaching part. The friction generating portions are provided between an attaching part and central parts, and apply a resistance force against a rotation of the central parts relative to the attaching part.

11 Claims, 14 Drawing Sheets

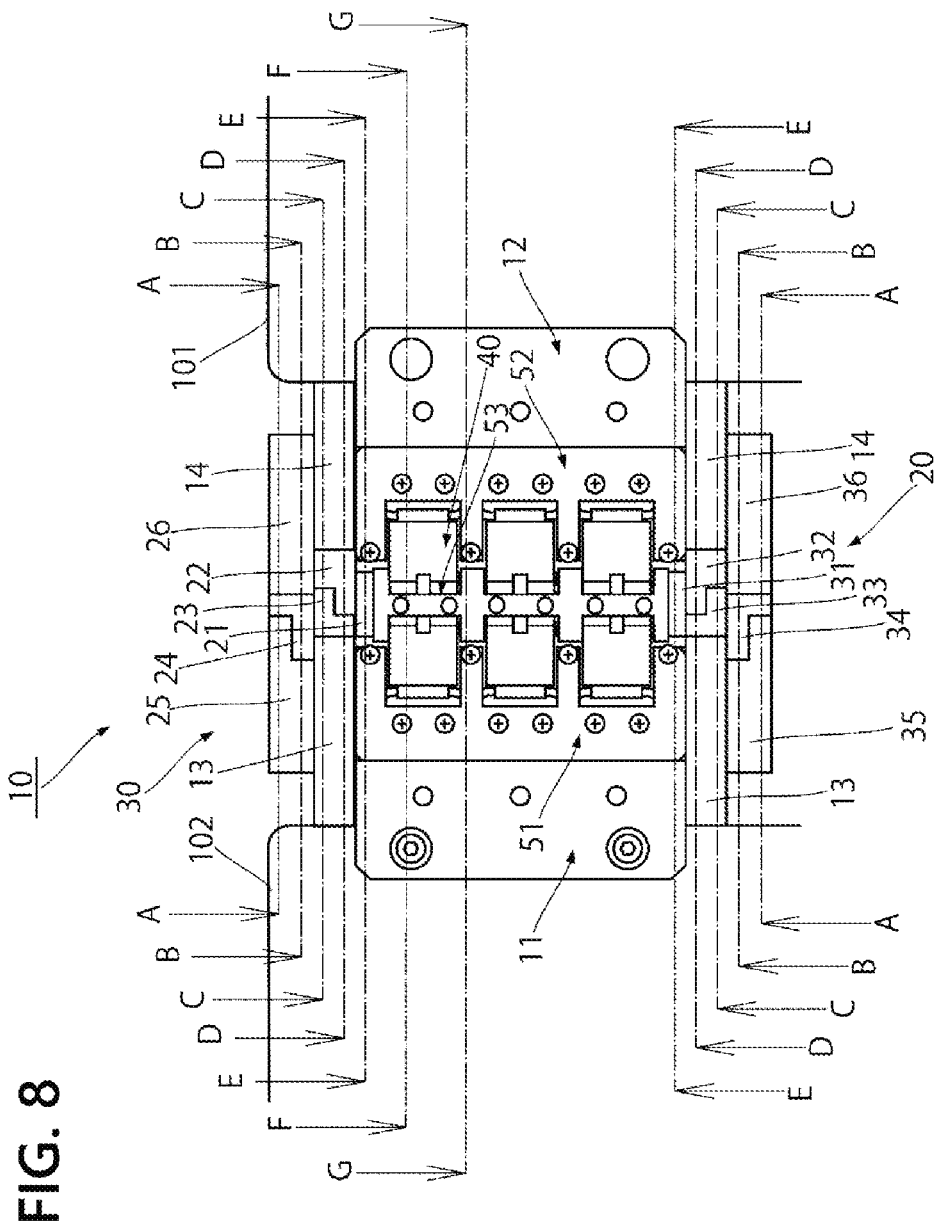

OPENING AND CLOSING DEVICE AND TERMINAL DEVICE

FIELD OF THE INVENTION

The invention relates to an opening and closing device for supporting a sheet-like flexible display panel, e.g. organic EL (electroluminescence) panel, LED panel, etc., provided over both a first casing and a second casing to bend and unfold it, and to a terminal device using such an opening and closing device.

BACKGROUND ART

In recent years, a terminal device such as smartphone, tablet PC, game machine, cellular phone etc. is being put into practical use, wherein a flexible display panel, e.g. organic EL panel, LED panel, etc. is provided to cross both a first casing and a second casing, so that the flexible display panel is bent into twofold while out of use, and that it is unfolded into a single plane in use. For such a terminal device, an example of an opening and closing device for flexibly coupling a first casing and a second casing is disclosed in JP Laid-Open Patent Application No. 2014-161009.

In an opening and closing device according to JP Laid-Open Patent Application No. 2014-161009, a first casing and a second casing are flexibly coupled by resin bellows structure to support an organic EL panel. Still further, when the first casing and the second casing overlap each other and the organic EL panel is bent into a folded state, the opening and closing device forms a curvature in the shape of cylindrical surface to give the organic EL panel a predetermined curvature radius. Furthermore, in the opening and closing device according to JP Laid-Open Patent Application No. 2014-161009, a reinforced beam made of shape-memory alloy is provided in curving direction so as to cross the resin bellows structure. The reinforced beam can be freely plastically deformed to maintain its shape, so that the first casing and the second casing can be held at any opening angle.

In an opening and closing device, wherein a first casing and a second casing are coupled to support a flexible display panel, it is preferable to be able to realize a curvature at a predetermined curvature radius, when the flexible display panel is bent into a folded state. This is because some properties of the flexible display panel may be impaired by folding it to a curvature radius smaller than what is acceptable. Furthermore, in the opening and closing device, a bending surface supporting the flexible display panel preferably has a constant length as accompanied by a bending/unfolding of the flexible display panel. This is because some properties of the flexible display panel may be impaired by a remarkable fluctuation in a length of the bending surface as accompanied by the bending/unfolding, which results in excessive force acting on the flexible display panel. Furthermore, in the opening and closing device, the first casing and the second casing supporting the flexible display panel can be preferably held at any opening angle. If the opening and closing device itself has a function of holding the unfolding (it is also referred to as opening and closing) angle, it can maintain a state of the flexible display panel being bent into twofold or unfolded into a single plane, even without hold on the flexible display panel by hands or tool.

However, a resin bellows structure as disclosed in JP Laid-Open Patent Application No. 2014-161009 has a different length in a closed state when the first casing and the second casing overlaps each other, from an opened state when the first casing and the second casing are unfolded to form a plane. In this manner, if the flexible display panel is supported on bending parts of the bellows structure, a tension force is applied on the flexible display panel in its closed state, while a gap is generated between the flexible display panel and the bellows structure in its opened state.

To this end, another opening and closing device has been proposed, wherein a plurality of link members are coupled so as to be slidable with rotation in a bending direction, and wherein an arc-shaped bending surface is formed by an enveloping surface inside the plurality of link members. Still further, it has been further proposed that a coupling portion for adjacent link members is tightly fitted to generate a friction force, such that the first casing and the second casing can be held at any opening angle.

However, if a coupling portion for adjacent link members undergoes an interference fit, a mechanism including such cannot be a link mechanism, the adjacent link members cannot smoothly slide relative to each other in a bending direction, so that the entire plurality of link members cannot smoothly generate a bending or release from bending.

SUMMARY OF THE INVENTION

An object of the invention is to provide an opening and closing device using a flexible display panel provided over both a first casing and a second casing, which has a simple structure, and satisfies required functions as listed above, as well as enables the flexible display panel to be more smoothly bent/unfolded.

An opening and closing device according to the invention openably and closably couples a first casing and a second casing, and forms an arc-shaped cross section in a closed state to support a flexible display panel provided to cross both the first casing and the second casing. Furthermore, it comprises a first attaching member fixable to the first casing, a first link member slidable relative to the first attaching member with rotation, a second attaching member fixable to the second casing, a second link member slidable relative to the second attaching member with rotation, a central member provided between the first link member and the second link member, wherein its one end portion is slidable relative to the first link member with rotation, and other end portion is slidable relative to the second link member with rotation, first friction generating means provided between the first attaching member and the central member for applying a resistance force to a rotation of the central member relative to the first attaching member, and second friction generating means provided between the second attaching member and the central member for applying a resistance force to a rotation of the central member relative to the second attaching member.

According to the invention, it is possible to provide an opening and closing device using a flexible display panel provided over both a first casing and a second casing, which has a simple structure, and satisfies required functions as listed above, as well as enables the flexible display panel to be more smoothly bent/unfolded.

BRIEF DESCRIPTION OF THE DRAWINGS

FIG. 1A shows 0 degree, FIG. 1B—90 degrees, and FIG. 1C—180 degrees;

FIG. 2A shows an attached state, and FIG. 2B—an assembled state;

FIG. 4A shows a right-side coupling portion, and FIG. 4B—a left side coupling portion;

FIG. 8 shows an explanatory view for nomenclature of respective cross sections of an opening and closing device;

FIG. 9A shows an A-A cross section, FIG. 9B—a B-B cross section, FIG. 9C—a C-C cross section, FIG. 9D—a D-D cross section and FIG. 9E—an E-E cross section;

FIG. 10A shows an A-A cross section, FIG. 10B—a B-B cross section, FIG. 10C—a C-C cross section, FIG. 10D—a D-D cross section and FIG. 10E—an E-E cross section;

FIG. 11A shows an A-A cross section, FIG. 11B—a B-B cross section, FIG. 11C—a C-C cross section, FIG. 11D—a D-D cross section and FIG. 11E—an E-E cross section;

FIG. 12A shows a perspective view on an F-F cross section, FIG. 12B—an F-F cross section, FIG. 12C—a perspective view on a G-G cross section and FIG. 12D—a G-G cross section;

FIG. 13A shows a perspective view on an F-F cross section, FIG. 13B—an F-F cross section, FIG. 13C—a perspective view on a G-G cross section and FIG. 13D—a G-G cross section; FIG. 14A shows a perspective view on an F-F cross section, FIG. 14B—an F-F cross section, FIG. 14C—a perspective view on a G-G cross section and FIG. 14D—a G-G cross section.

EMBODIMENTS

Embodiments of the invention will be described in detail in reference to attached drawings. In the following embodiments, the entire structure composed of a plurality of link members coupled to each other forms a curvature and release from curvature, as accompanied by opening and closing of the terminal device. Furthermore, in adjacent link members, an arc convex portion formed on one of them is fitted into an arc groove formed on the other, so that a hinge (rotation portion) is formed without using a hinge shaft.

Embodiment 1

(Terminal Device)

Figure 1A:
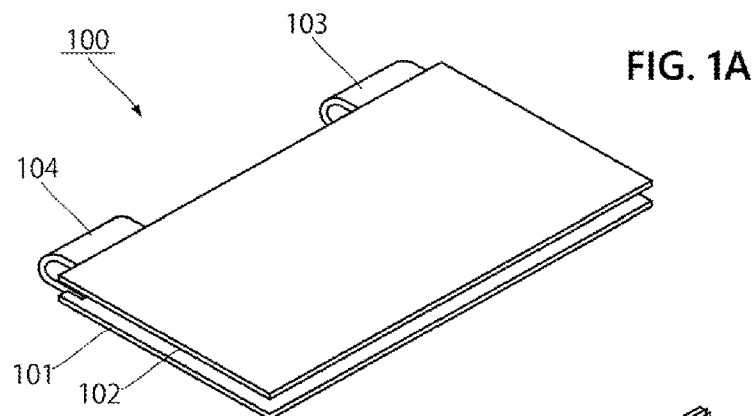
FIGS. 1A, 1B and 1C show an explanatory view of opening angles of a terminal device according to Embodiment 1, where
Figure 1B:
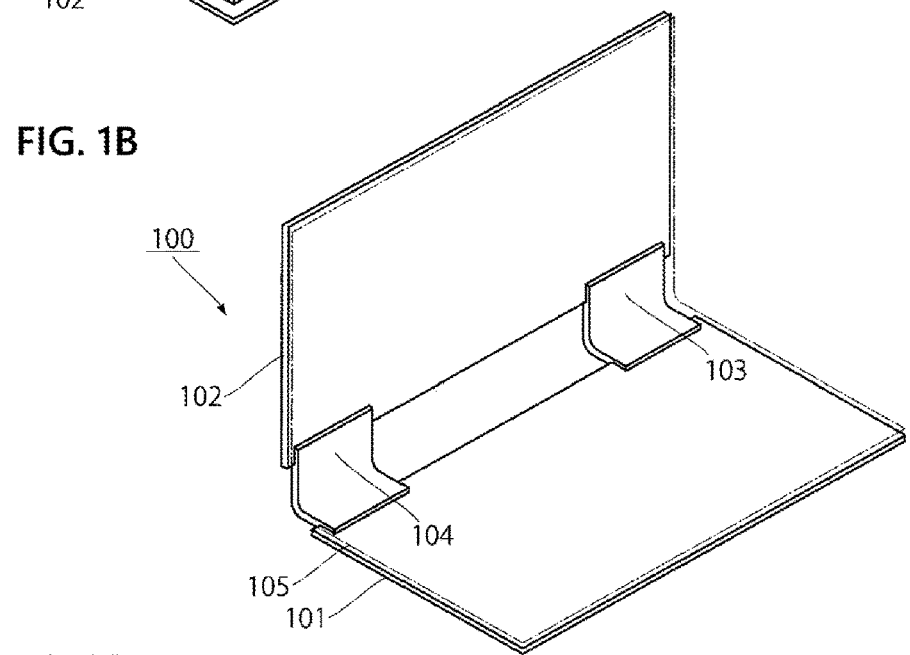
Figure 1C:
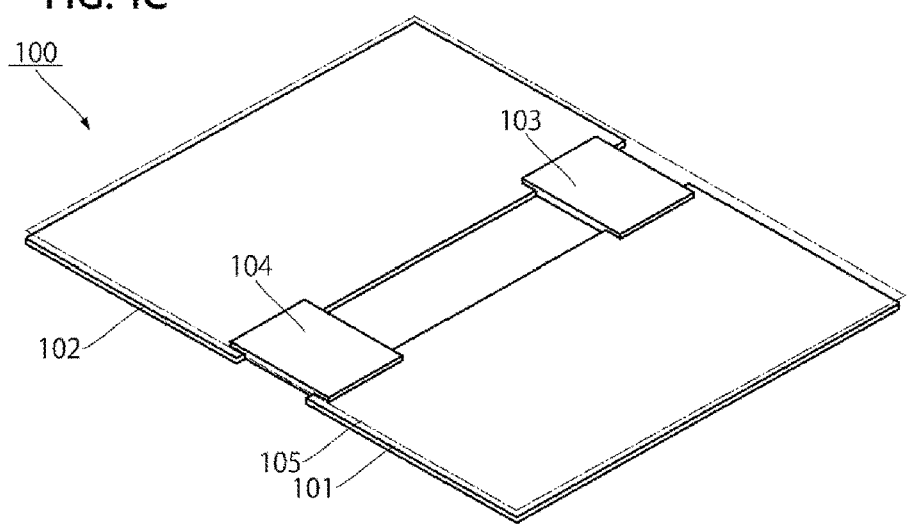

FIGS. 1A, 1B and 1C show an explanatory view of opening angles of a terminal device according to Embodiment 1. FIG. 1A shows 0 degree, FIG. 1B—90 degrees, and FIG. 1C—180 degrees. As show in FIG. 1A, a terminal device 100 according to Embodiment 1 is a PC display on which a flexible organic EL display panel is mounted. The terminal device is provided with the flexible display panel which extends to cross both casings sandwiching an opening and closing device 10 which can be folded to overlap each other. The opening and closing device 10 has a cylindrically bent surface formed between the both casings so as to support the flexible display panel.

In a terminal device 100 according to Embodiment 1, a first casing 101 and a second casing 102 are openably and closably coupled to each other by a pair of opening and closing devices 103, 104. The first casing 101 is an aluminum alloy box body in which a wireless communication antenna and a circuit board (not shown) are built-in. The second casing 102 is an aluminum alloy box body in which a secondary battery (not shown) is built. In a closed state, where the first casing 101 and the second casing 102 are opened to 0 degree, the opening and closing devices 103, 104 form enveloping surfaces both on an inner surface and an outer surface.

As show in FIG. 1B, a flexible organic EL panel 105 is attached onto a first casing 101, a second casing 102 and opening and closing devices 103, 104 so as to extend over and cover their entire inner surfaces. The organic EL panel 105 is an organic EL imaging element, wherein its entirety is bent in a cylindrical shape, following envelop surfaces of the inner surfaces of the opening and closing devices 103, 104. The organic EL panel 105 is powered by a secondary battery built in the second casing 102. The organic EL panel 105 is driven by a circuit board built in the first casing 101 to display an image. In the meantime, the organic EL panel 105 is very thin and sheet-shaped, with the element itself being 0.05 to 0.2 mm thick, but can be the one with soft spacer being disposed so that its thickness can be adjusted to 0.5 to 2.0 mm.

When a second casing 102 is opened relative to a first casing 101, opening and closing devices 103, 104 can maintain any opening angle within a range of 0 to 180 degrees of the second casing by friction generating portions (40) to stop the second casing. The opening and closing devices 103, 104 both form cylindrical surface-shaped envelop surfaces on their inner surfaces to support an organic EL panel 105, even if a second casing 102 is opened 90 degrees.

As shown in FIG. 1C, opening and closing devices 103, 104 both form on their inner surfaces flat surfaces having the same height as a first casing 101 and a second casing 102, when a second casing 102 is opened 180 degrees. A first casing 101, the second casing 102 and the inner surfaces of the opening and closing devices 103, 104 form flat surfaces to support a lower surface of an organic EL panel 105 at an identical height.

On the other hand, when opening and closing devices 103, 104 are composed of normal link members, that is, a caterpillar-shaped structure in which a plurality of link members disposed along a bent surface are respectively coupled via a hinge shaft, a length along a bending of inner surfaces fluctuates as accompanied by opening and closing of the opening and closing devices. On the other hand, the length along the bending of the inner surfaces is kept constant as accompanied with opening and closing of the opening and closing devices, on envelop surfaces on the center of the hinge shafts arranged along the bent surface in the shape of circumference. Therefore, a structure for rotating adjacent link members relative to each other is constructed without hinge shaft, in the opening and closing devices 103, 104, so that the space in which a hinge shaft should be disposed as in prior arts is given to an organic EL panel 105. In the opening and closing devices 103, 104, a central position for rotation of adjacent link members relative to each other is set on the inner surfaces of the opening and closing devices 103, 104, so that the length along the bending of the bent surfaces formed by the inner surfaces (the length along the bent surfaces at a height position at which an organic EL element of the organic EL panel is disposed, if the thickness of the organic EL panel is taken into consideration) does not have so remarkable fluctuations.

(Opening and Closing Device)

Figure 2A:
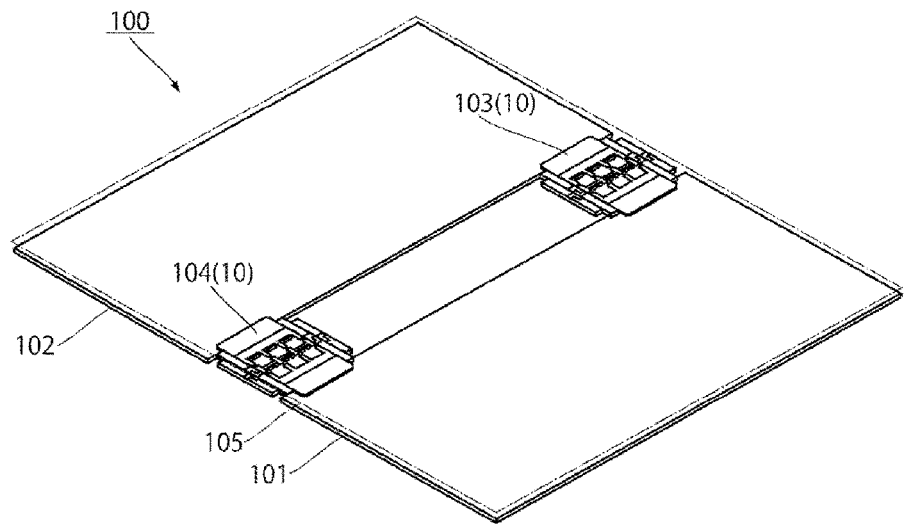
FIGS. 2A and 2B show an explanatory view of an opening and closing device, where
Figure 2B:
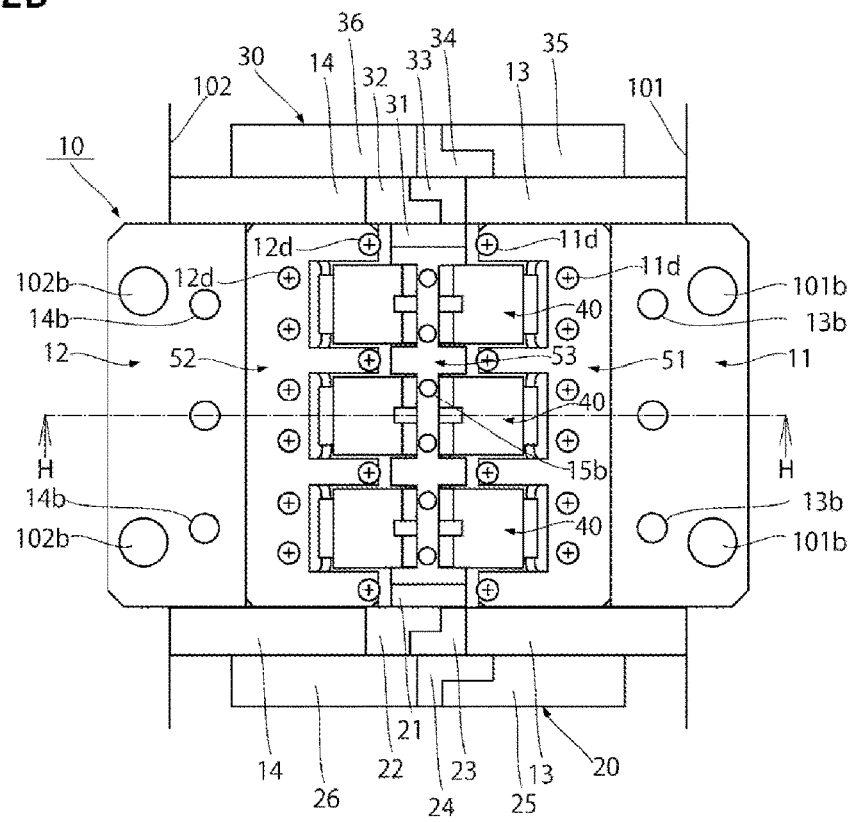
Figure 3:
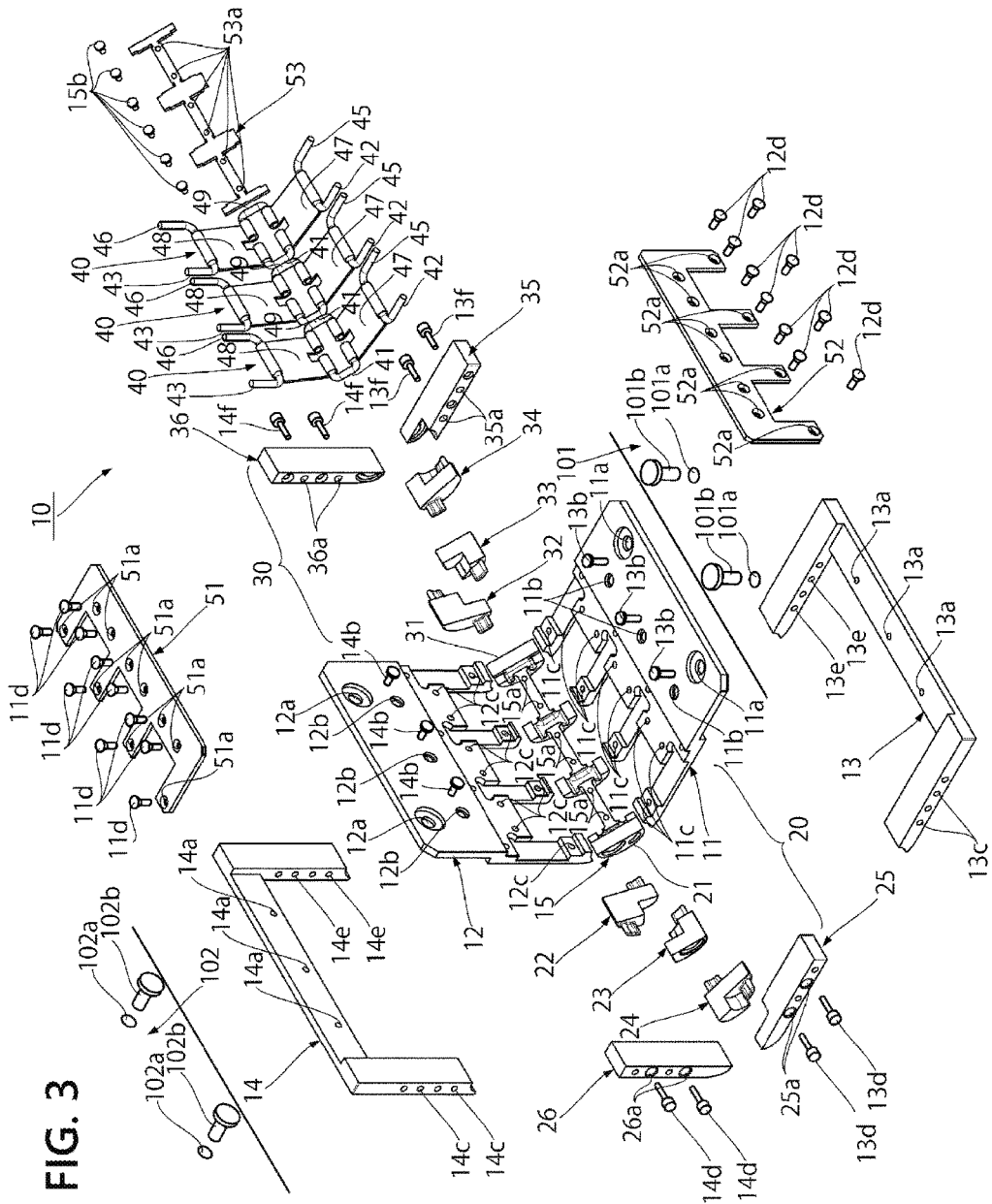
FIG. 3 shows an exploded perspective view of an opening and closing device.

FIGS. 2A and 2B show an explanatory view of an opening and closing device. FIG. 3 shows an exploded perspective view of an opening and closing device. FIG. 2A shows an attached state, and FIG. 2B—an assembled state. As shown in FIG. 2A, opening and closing devices 103, 104 openably and closably couple a first casing 101 and a second casing 102. The opening and closing devices 103, 104 are assembled using common components. Since both the opening and closing devices 103, 104 are identical parts, so they are collectively referred to as opening and closing device 10 in the following.

As shown in FIG. 2B, an opening and closing device 10 openably and closably couple a first casing 101 and a second casing 102. The opening and closing device 10 is bisymmetrically assembled using parts bisymmetrically formed about a central line H-H. Since in the opening and closing device 10 the parts bisymmetrically formed about a central line H-H have substantially identical structure, two sets of bisymmetrical components are denoted with reference numerals respectively having common ones places and different tens places (20 to 26; 30 to 36).

As shown in FIG. 3, an attaching member 11 is integrally attached to a first casing 101 by inserting a retention pin 101b into an attaching hole 11a as it overlaps an attaching hole 101a of the first casing 101, and then caulking a tip of the retention pin 101b. An attaching member 12 is integrally attached to a second casing 102 by inserting a retention pin 102b into an attaching hole 12a as it overlaps an attaching hole 102a of the second casing 102, and then caulking a tip of the retention pin 102b. Therefore, the attaching member 11 being an example of a first attaching member is fixable to the first casing 101, and the attaching member 12 being an example of a second attaching member to the second casing 102.

An attaching member 11 is integrally fixed to a link supporting member 13 by inserting a retention pin 13b into an attaching hole 11b as it overlaps an attaching hole 13a of the link supporting member 13, and then caulking a tip of the retention pin 13b. An attaching member 12 is integrally fixed to a link supporting member 14 by inserting a retention pin 14b into an attaching hole 12b as it overlaps an attaching hole 14a of the link supporting member 14, and then caulking a tip of the retention pin 14b.

A link supporting member 25 is integrally fixed to the link supporting member 13 by fastening a male screw 13d as is passed through a circular hole 25d of the link supporting member 25 to female screw 13c of the link supporting member 13. A link supporting member 26 is integrally fixed to the link supporting member 14 by fastening a male screw 14d as is passed through a circular hole 26d of the link supporting member 26 to female screw 14c of the link supporting member 14. A link supporting member 35 is integrally fixed to the link supporting member 13 by fastening a male screw 13f as is passed through a circular hole 35d of the link supporting member 35 to female screw 13e of the link supporting member 13. A link supporting member 36 is integrally fixed to the link supporting member 14 by fastening a male screw 14f as is passed through a circular hole 36d of the link supporting member 36 to female screw 14e of the link supporting member 14.

A coupling portion 20 couples an attaching member 11 and an attaching member 12 by disposing link members 22, 24 between link supporting members 25, 26 and a central member 21. The coupling portion 20 forms arc-shaped envelop surfaces on the inside and the outside of an opening and closing device 10 as accompanied by a rotation of the attaching member 12 relative to the attaching member 11, wherein the surfaces smoothly couple the attaching member 11 and the attaching member 12. A coupling portion 30 couples an attaching member 11 and an attaching member 12 by disposing link members 32, 34 between link supporting members 35, 36 and a central member 31. The coupling portion 30 forms arc-shaped envelop surfaces on the inside and the outside of an opening and closing device 10 as accompanied by a rotation of the attaching member 12 relative to the attaching member 11, wherein the surfaces smoothly couple the attaching member 11 and the attaching member 12.

A central member 21 of a coupling portion 20 and a central member 31 of a coupling portion 30 are integrally formed as a central block 15 being a single component sharing a circumferential surface on the outside and a flat surface on the inside. The central member 21 and the central member 31 are located on end portions on the right and the left to integrally rotate.

Central members 21, 31, 23, 33, link members 22, 32, link members 24, 34, link supporting members 13, 14, link supporting members 25, 35, and link supporting members 26, 36 have their respective inner and outer shapes so as to form envelop surfaces in the shape of circular surface on the outer surface and the inner surface of an opening and closing device 10. A central block 15, the link supporting members 13, 14, the link supporting members 25, 35, 26, 36, the link members 22, 32, the link members 24, 34, and the central members 23, 33 are made up of MIM (metal injection mold) part, a ferrous metal, a stainless steel, titanium alloy and so on, in consideration of strength of each coupling portion.

(Coupling Portions)

Figure 4A:
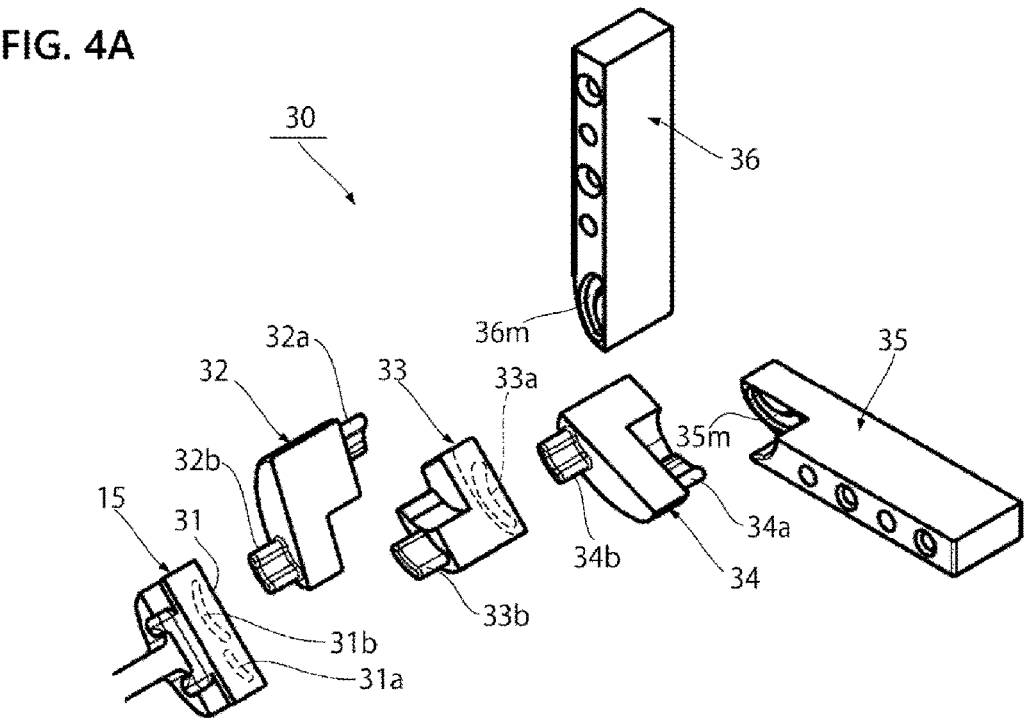
FIGS. 4A and 4B show an exploded perspective view of coupling portions, where
Figure 4B:
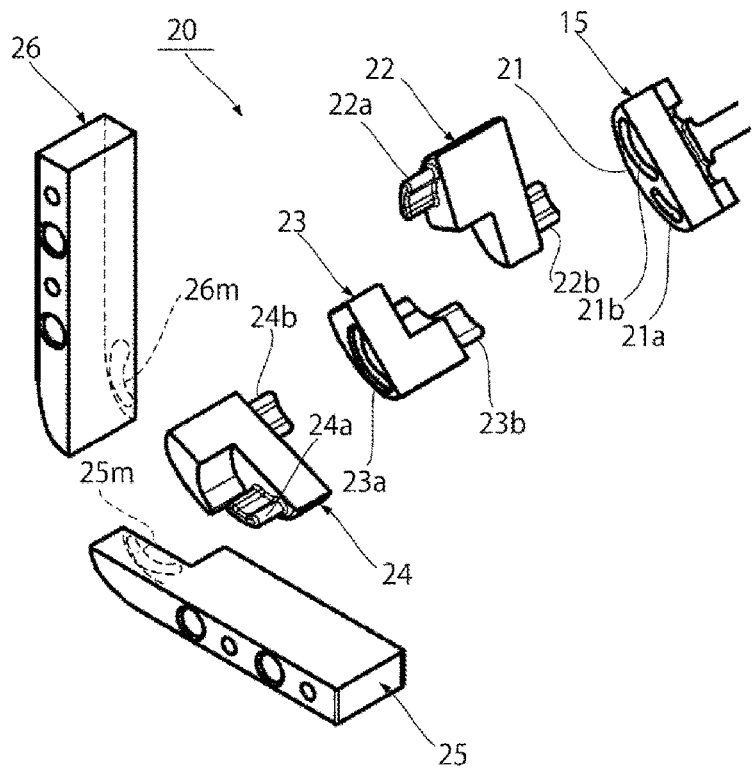

FIGS. 4A and 4B show an exploded perspective view of coupling portions. FIG. 4A shows a right-side coupling portion, and FIG. 4B—a left side coupling portion. As shown in FIG. 3, link supporting members 25, 35 are fixed to an attaching member 11 via a link supporting member 13. Link supporting members 26, 36 are fixed to an attaching member 12 via a link supporting member 14.

As shown in FIGS. 4A and 4B, in link members 24, 34, short arc convex portions 24a, 34a are loosely fitted into long arc grooves 25m, 35m of the link supporting members 25, 35, while short arc convex portions 24b, 34b on the other side are loosely fitted into long arc grooves 23a, 33a of a central member 23. In this manner, the link members 24, 34 are slidable in an arc shape, as their both ends are guided by the arc grooves 25m, 35m and the arc grooves 23a, 33a. Therefore, the link members 24, 34 being examples of first link members are slidable with rotation relative to the link supporting members 25, 35.

In link members 22, 32, short arc convex portions 22a, 32a are loosely fitted into long arc grooves 26m, 36m of the link supporting members 26, 36, while short arc convex portions 22*b*, 32*b* on the other side are loosely fitted into long arc grooves 21*b*, 31*b* of a central member 21, 31. In this manner, the link members 22, 32 are slidable in an arc shape, as their both ends are guided by the arc grooves 26*m*, 36*m* and the arc grooves 21*b*, 31*b*. Therefore, the link members 22, 32 being examples of second link members are slidable with rotation relative to the link supporting members 26, 36.

In central members 23, 33, short arc convex portions 23*b*, 33*b* are loosely fitted into short arc grooves 21*a*, 31*a* of central members 21, 31. In this manner, the central members 23, 33 integrally rotate with the central members 21, 31, with no relative rotation nor slide to the latter. The central members 23, 33 and the central members 21, 31 being examples of central members couple link members 24, 34 and link members 22, 32. In the central members 21, 31, short arc portions 22*a*, 32*a* of link members 22, 32 are loosely fitted onto long arc convex grooves 21*b*, 31*b*. In the central members 23, 33, short arc portions 24*a*, 34*a* of link members 24, 34 are loosely fitted onto long arc convex grooves 23*a*, 33*a*. Therefore, in the central members 21, 31, their one end portions are slidable relative to link members 24, 34 with rotation, and their other end portions are slidable relative to the link members 22, 32 with rotation.

Arc grooves 25*m*, 35*m* of link supporting members 25, 35 as well as arc grooves 23*a*, 33*a* of central members 23, 33 are formed in a circumferential shape, such that the center of a circumference coincides with inner surfaces of link supporting members 25, 35 and the central members 23, 33. Arc grooves 25*m*, 35*m* of link supporting members 26, 36 as well as arc grooves 21*b*, 31*b* of central members 21, 31 are formed in a circumferential shape, such that the center of a circumference coincides with inner surfaces of the link supporting members 26, 36 and the central members 21, 31. In this manner, an inner surface of an opening and closing device 10 formed as envelop surfaces of these elements and link members 22, 32, 24, 34 has a length which undergoes small fluctuations along a curvature as accompanied by opening and closing.

To prevent an organic EL panel (105) disposed so as to overlap the inner surface from being drawn or compressed, as accompanied by opening and closing of an opening and closing device 10, envelop surfaces formed on the inner surface preferably have a constant length in a circumferential direction as accompanied by opening and closing of an opening and closing device 10. To this end, as shown in FIGS. 4A and 4B, a combination of long circumferential grooves 31*b*, 36*m*, 33*a*, 35*m* and a short circumferential projections 32*a*, 32*b*, 34*a*, 34*b* controls a rotation of link members 22, 32, 24, 34. If such rotation is controlled by hinge shafts, they will be obstacles to design of an organic EL panel 105, which cannot be thus provided at a height position at which its length in a circumferential direction is constant as accompanied by opening and closing of an opening and closing device 10.

On the other hand, a normal opening and closing device in which adjacent link members are coupled via hinge shafts would be capable of maintaining an opening angle of the opening and closing device by providing friction generating portions around the hinge shafts. However, in an opening and closing device 10, arc convex portions are held in arc grooves to rotate adjacent link members relative to each other, thus the opening and closing device has no hinge shafts; therefore, friction generating portions cannot be provided around hinge shafts. Still further, in the opening and closing device 10, to increase a friction between arc grooves and arc convex portions to maintain an opening angle of the opening and closing device 10, a smooth slide movement of adjacent link members is disturbed to made difficult even opening and closing of the opening and closing device 10. Therefore, in Embodiment 1, a friction generating portion is provided between one link member and the one next to the next link member. In this manner, a smooth slide movement is possible between adjacent link members, so that the opening and closing device 10 can be smoothly opened and closed.

(Friction Generating Portion)

Figure 5:
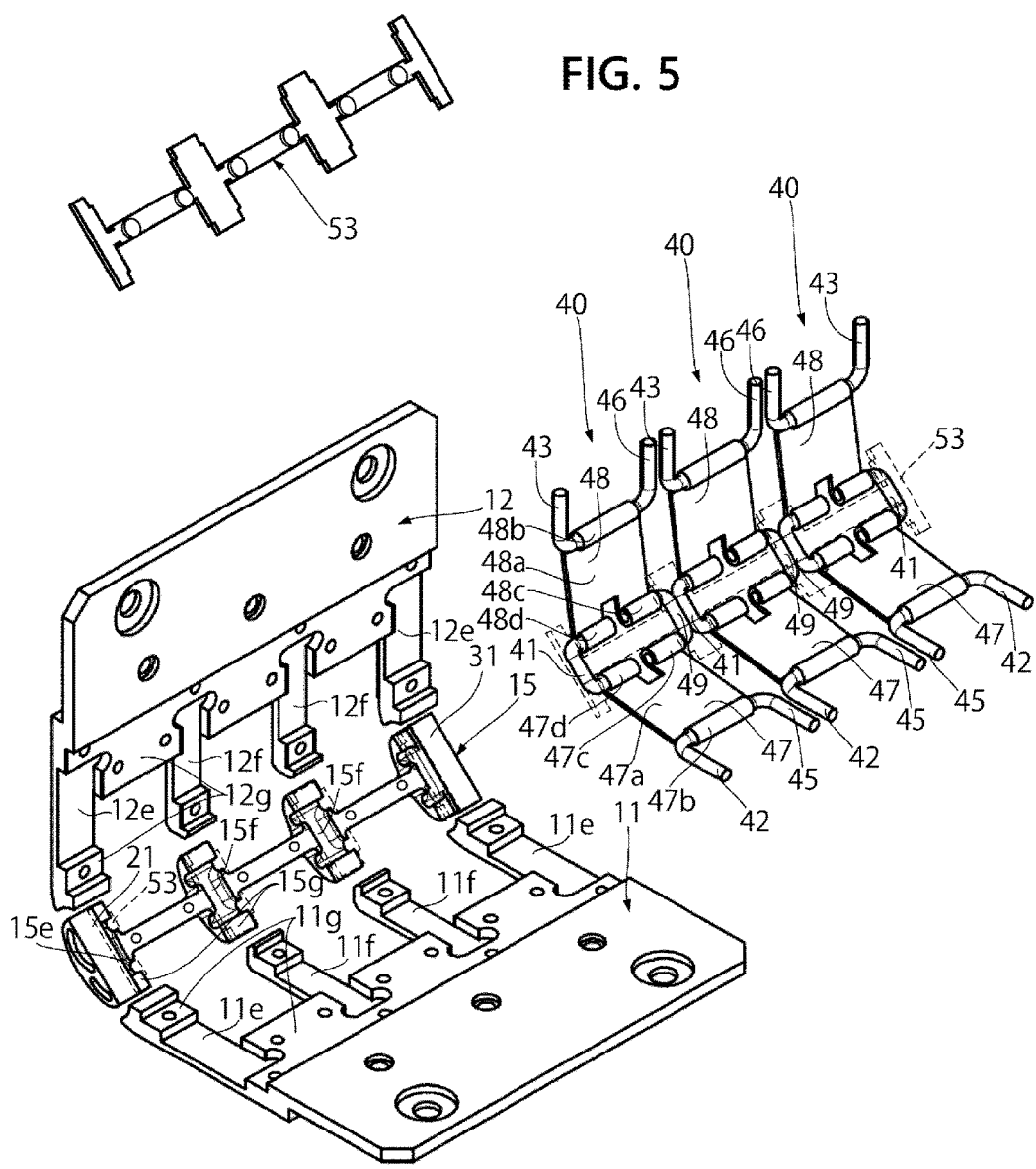
FIG. 5 shows an exploded perspective view of a friction generating portion.
Figure 6:
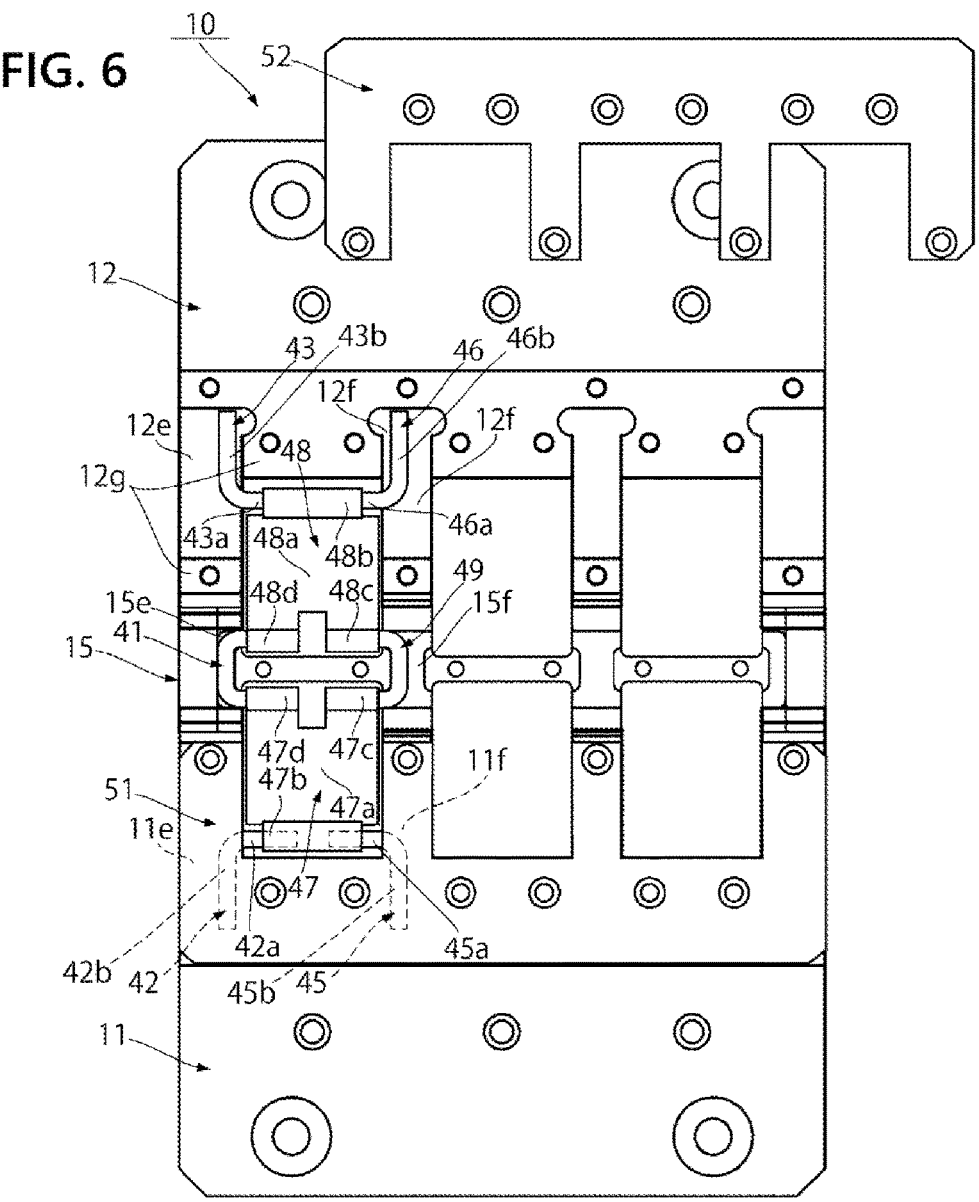
FIG. 6 shows an explanatory view of a structure and an attachment of a friction generating portion.
Figure 7:
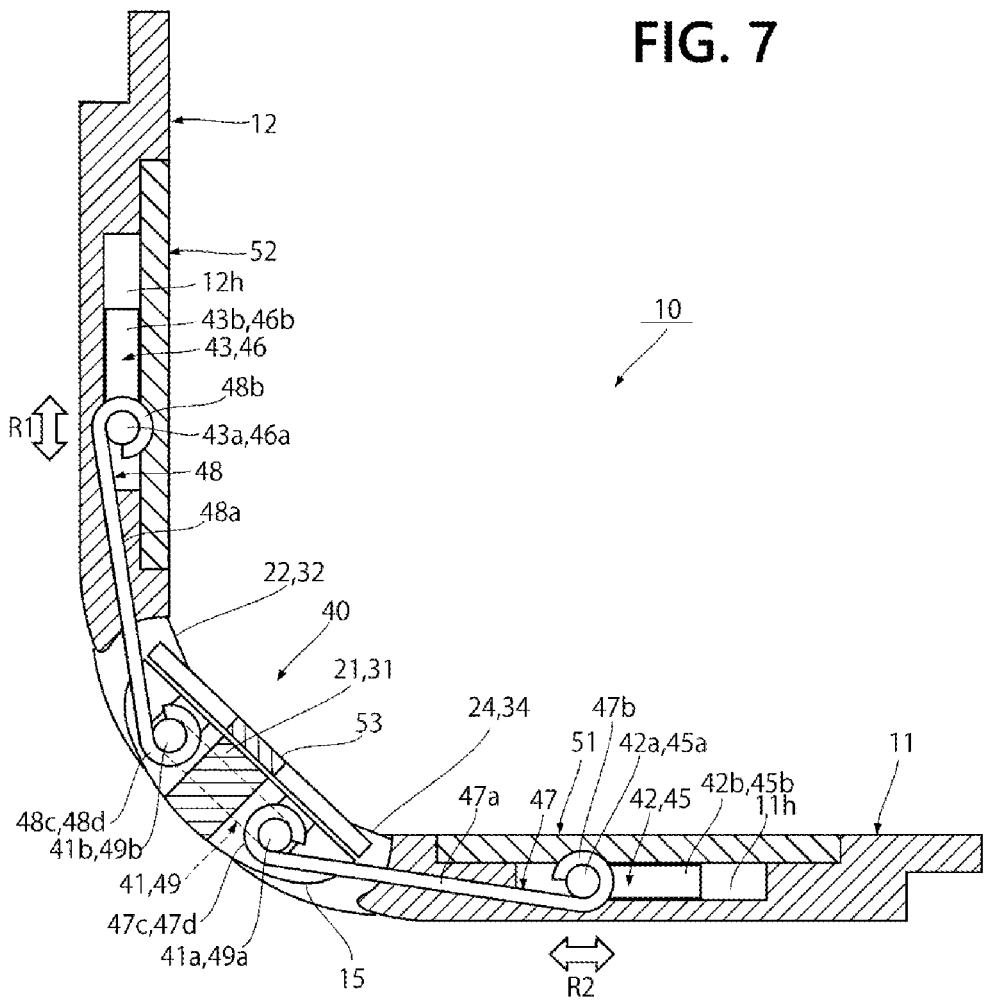
FIG. 7 shows a cross section of a friction generating portion.

FIG. 5 shows an exploded perspective view of a friction generating portion. FIG. 6 shows an explanatory view of a structure and an attachment of a friction generating portion. FIG. 7 shows a cross section of a friction generating portion. As shown in FIG. 3, each friction generating portion 40 jumps over link members 22, 32, 24, 34 to couple an attaching member 11, a central block 15 and an attaching member 12. As shown in FIG. 5, each friction generating portion 40 has its L-shaped shafts 42, 45 located on the attaching member 11, its U-shaped shafts 41, 49 located on the central block 15 and its L-shaped shafts 43, 46 located on the attaching member 12.

As shown in FIG. 3, each friction generating portion 40 is attached by plates 51, 52, 53 to the attaching member 11, the central block 15 and the attaching member 12, so as to overlap them. The plate 51 fixed integrally with the attaching member 11 by fastening a male screw 11*d* as is passed through a circular hole 51*a* to a female screw 11*c* of the attaching member 11. The plate 52 fixed integrally with the attaching member 12 by fastening a male screw 12*d* as is passed through a circular hole 52*a* to a female screw 12*c* of the attaching member 12. The plate 53 fixed integrally with the central block 15 by fastening a male screw 15*b* as is passed through a circular hole 53*a* to a female screw 15*a* of the central block 15.

FIG. 6 illustrates in detail an attached state of L-shaped shafts 42, 43, 45, 46; here, in order to facilitate an understanding of relationship between components, several parts shown in FIG. 3 are omitted. As shown in FIG. 6, an end portion 42*b* of an L-shaped shaft 42 is slidably held between a plate 51 and a slide surface 11*e* of an attaching member 11. An end portion 43*b* of an L-shaped shaft 43 is slidably held between a plate 52 attached onto a slide surface 12*e* of an attaching member 12 and the slide surface 12*e*. Equally, an end portion 45*b* of an L-shaped shaft 45 is slidably held between the plate 51 and a slide surface 11*f* of the attaching member 11. An end portion 46*b* of an L-shaped shaft 46 is slidably held between the plate 52 and a slide surface 12*f*. A groove portion 15*e* of the central block 15 loosely holds a portion bent in the U shape of a U-shaped shaft 41. A groove portion 15*f* of the central block 15 loosely holds a portion bent in the U shape of a U-shaped shaft 49.

As shown in FIG. 7, friction generating portions 40 being an example of first friction generating means couple an attaching member 11 and a central block 15 by friction bearings 47, and apply a resistance force against a rotation of central members 21, 31 relative to the attaching member 11. The friction bearings 47 couple L-shaped shafts 43, 46 and U-shaped shafts 41, 49. The friction bearings 47 form a circular hole by curling end portions 47*b*, 47*c*, 47*d* of an elastic plate material (stainless) 47*a*, and hold the L-shaped shafts 43, 46 and the U-shaped shafts 41, 49 respectively in the circular hole by interference-fit.

Friction generating portions 40 being an example of second friction generating means couple an attaching member 12 and a central block 31 by friction bearings 48, and apply a resistance force against a rotation of central members 21, 31 relative to the attaching member 12. The friction bearings 48 couple L-shaped shafts 42, 45 and U-shaped shafts 41, 49. The friction bearings 48 form circular holes by curling end portions 48b, 48c, 48d of an elastic plate material (stainless) 48a in a cylindrical shape, and holds the L-shaped shafts 43, 46 and the U-shaped shafts 41, 49 respectively in the circular holes by interference-fit.

End portions 47b of the friction bearings 47 for holding the L-shaped shafts 42, 45 are slidably attached to the attaching member 11 by a plate 51 shown in FIG. 3. End portions 48b of the friction bearings 48 for holding the L-shaped shafts 43, 46 are slidably attached to the attaching member 12 by a plate 52 shown in FIG. 3. End portions 47c, 47d, 48c, 48d of the friction bearings 47, 48 for holding the U-shaped shafts 41, 49 are attached to a central block 15 by a plate 53.

As shown in FIG. 7, friction bearings 47 jump over link members 24, 34 to couple end portions 42a, 45a of L-shaped shafts 42, 45 and end portions 41a, 49a of the U-shaped shafts 41, 49. Friction bearings 48 jump over link members 22, 32 to couple end portions 43a, 46a of L-shaped shafts 43, 46 and end portions 41b, 49b of the U-shaped shafts 41, 49.

End portions 41a, 49a of U-shaped shafts 41, 49 being examples of first friction members are provided on central members 21, 31 so as to restrict a rotation relative to the central members 21, 31. Each of the friction bearings 47 has one end portion 47b attached to an attaching member 11, and other end portions 47c, 47d fitted onto the U-shaped shafts 41, 49 to apply friction force being a resistance force. End portions 41b, 49b of the U-shaped shafts 41, 49 being examples of third friction members are provided on the central members 21, 31 so as to restrict a rotation relative to the central members 21, 31. Each of friction bearings 48 has an end portion 48b attached to an attaching member 12, and end portions 48c, 48d fitted onto the U-shaped shafts 41, 49 to apply friction force being a resistance force. The end portions 42a, 45a of the L-shaped shafts 42, 45 being examples of fifth friction members are provided on the attaching member 11 so as to restrict a rotation relative to the attaching member 11, and fitted into the end portions 47b of the friction bearings 47 to apply a friction force being a resistance force. The end portions 43a, 46a of the L-shaped shafts 43, 46 being examples of fifth friction members are provided on the attaching member 12 so as to restrict a rotation relative to the attaching member 12, and fitted into the end portions 48b of the friction bearings 48 to apply a friction force being a resistance force.

On the other hand, in an opening and closing device 10, envelop surfaces formed by a plurality of link members substantially correspond to centers of a relative rotation of adjacent link members. In other words, imaginary hinge shafts in a relative rotation of adjacent link members are disposed along envelop surfaces formed by a plurality of link members on their inside. Then, an organic EL panel 105 is disposed at a height position at which a length along a bending does not fluctuate so much as accompanied by an opening and closing of the opening and closing device 10. In this manner, L-shaped shafts 42, 43, 45, 46 and U-shaped shafts 41, 49 of friction generating portions 40 cannot be disposed at positions of imaginary hinge shafts, but displaced far outward from such positions. Therefore, a perimeter of a circumferential surface on which the L-shaped shafts 42, 43, 45, 46 and the U-shaped shafts 41, 49 are disposed largely fluctuates as accompanied by an opening and closing of the opening and closing device 10. However, since the U-shaped shafts 41, 49 are fixed to a central member 21, it is impossible to move along a bending of the inner surfaces. In this manner, if then the L-shaped shafts 42, 43, 45, 46 of the friction generating portions 40 are fixed to attaching members 11, 12, the friction generating portions 40 diagonally lock a distance between two attaching members 11, 12, so that it is difficult to open and close the opening and closing device 10. Therefore, in an opening and closing device 10, end portions 42b, 43b, 45b, 46b of the L-shaped shafts 42, 43, 45, 46 are attached along the attaching members 11, 12 so as to be slidable in a direction along the bending.

(Slide of L-Shaped Shafts)

End portions 42b, 45b of L-shaped shafts 42, 45 are slidably held in a space 11h of an attaching member 11. The L-shaped shafts 42, 45 slide along the attaching member 11 in the space 11h as accompanied by a rotation of central members 21, 31 relative to the attaching member 11. End portions 43b, 46b of L-shaped shafts 43, 46 are slidably held in a space 12h of an attaching member 12. The L-shaped shafts 42, 45 slide along the attaching member 12 in the space 11h as accompanied by a rotation of central members 21, 31 relative to the attaching member 12.

End portions 41a, 49a of U-shaped shafts 41, 49 and end portions 41b, 49b of the U-shaped shafts 41, 49 are respectively composed of the U-shaped shafts 41, 49 being single pieces. The end portions 41a, 49a of U-shaped shafts 41, 49 and the end portions 41b, 49b of the U-shaped shafts 41, 49 are respectively composed of parts facing each other in parallel of a metal wire bent in a U-shape. Friction bearings 47, 48 are composed of elastic plate materials, wherein their respective cross sections are bent so as to pinch cross sections of a metal wire.

In friction generating portions 40, first friction generating means and second friction generating means are integrally coupled on a central block 15, by the U-shaped shafts 41, 49. A plurality of sets of friction generating portions 40 are disposed between a pair of coupling portions 20, 30, wherein each of coupling portions is composed of an attaching member 11, link members 24, 34, an attaching member 11, link members 22, 32 and a central block 15. Since in friction generating portions 40, friction resistances have fluctuations due to fluctuations in diameters of the U-shaped shafts 41, 49 and of L-shaped shafts 42, 43, 45, 46, as well as those of circular holes of the friction bearings 47, 48, a combination of three friction generating portions 40 is selected such that a total rotation resistance is equal on each of rotation centers of the friction generating portions 40.

(Cross Sections of Coupling Portions for Different Opening Angles)

FIG. 8 shows an explanatory view for nomenclature of respective cross sections of an opening and closing device. FIGS. 9A, 9B, 9C, 9D and 9E show respective cross sections of coupling portions at an opening angle of 0 degree. FIGS. 10A, 10B, 10C, 10D and 10E show respective cross sections of coupling portions at an opening angle of 90 degrees. FIGS. 11A, 11B, 11C, 11D and 11E shows respective cross sections of coupling portions at an opening angle of 180 degrees. FIG. 11A shows an A-A cross section, FIG. 11B—a B-B cross section, FIG. 11C—a C-C cross section, FIG. 11D—a D-D cross section and FIG. 11E—an E-E cross section.

As shown in FIG. 8, cross sections are defined at respective positions A to E of coupling portions; then cross sections for different opening angles are shown in FIGS. 9A to 11E.

As shown in FIGS. 9A to 11A, short arc convex portions 24a, 34a of link members 24, 34 are loosely fitted into long arc grooves 25m, 35m of link supporting members 25, 35, so that these link members are slidable with rotation relative to the link supporting members 25, 35. As shown in FIGS. 9B, 10B and 11B, short arc convex portions 22*a*, 32*a* of link members 22, 32 are loosely fitted into long arc grooves 25*m*, 35*m* of link supporting members 26, 36, so that these link members are slidable with rotation relative to the link supporting members 26, 36.

Figure 9A:
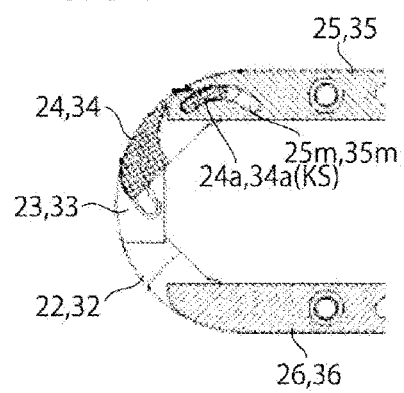
FIGS. 9A, 9B, 9C, 9D and 9E show respective cross sections of coupling portions at an opening angle of 0 degree; where
Figure 9B:
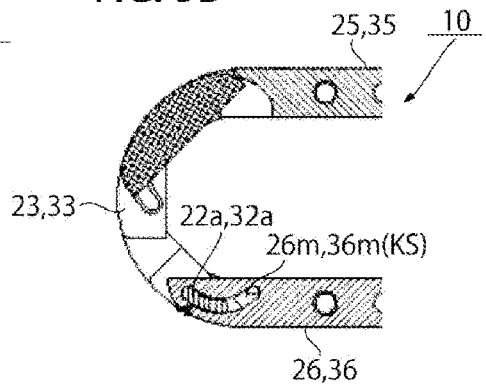
Figure 9C:
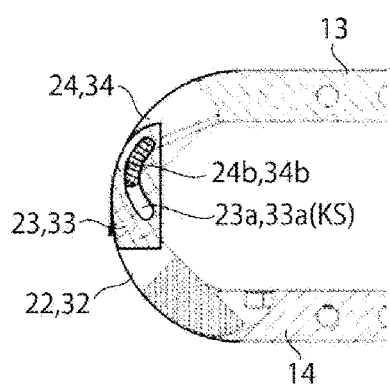
Figure 9D:
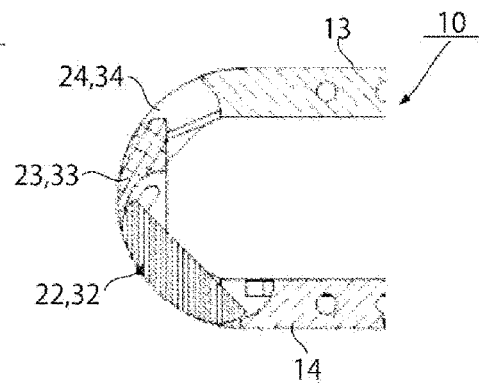
Figure 9E:
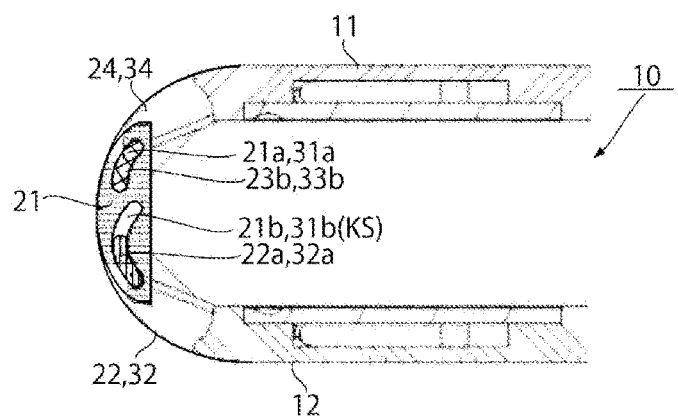
Figure 10A:
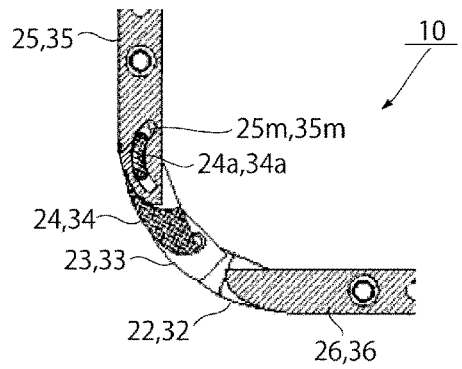
FIGS. 10A, 10B, 10C, 10D and 10E show respective cross sections of coupling portions at an opening angle of 90 degree; where
Figure 10B:
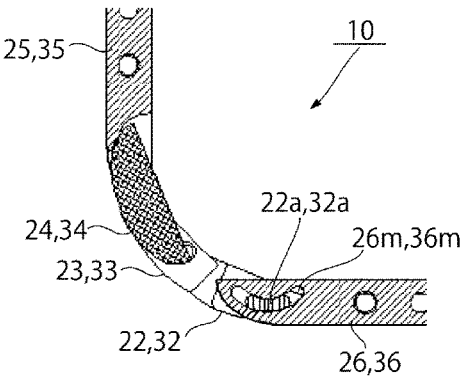
Figure 10C:
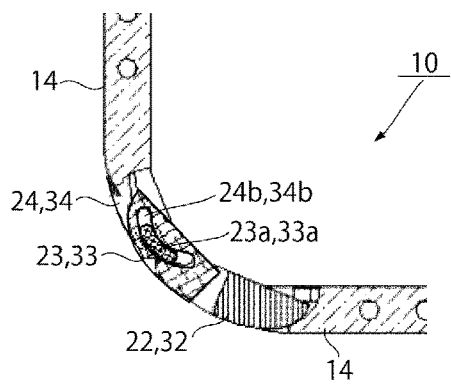
Figure 10D:
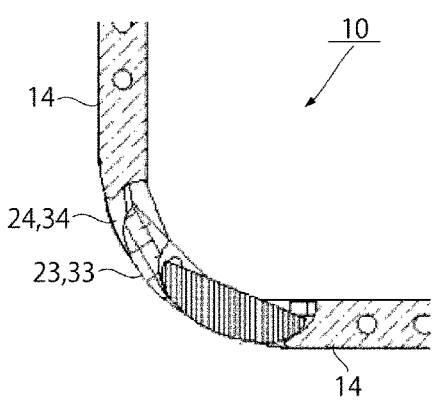
Figure 10E:
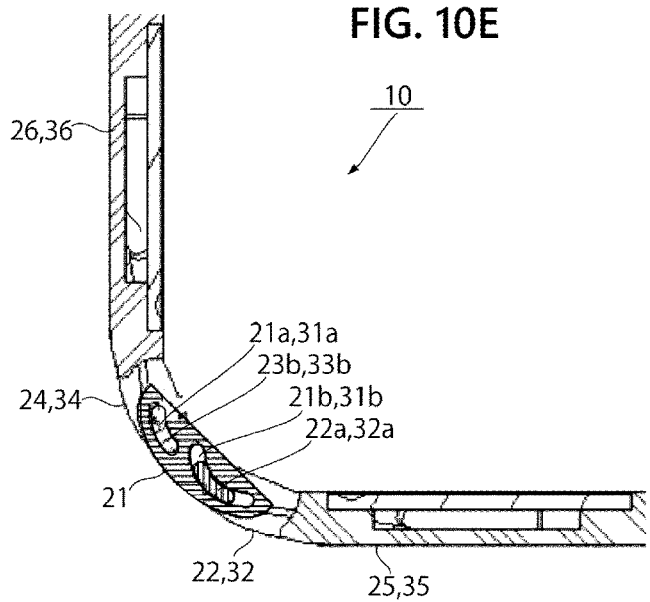
Figure 11A:
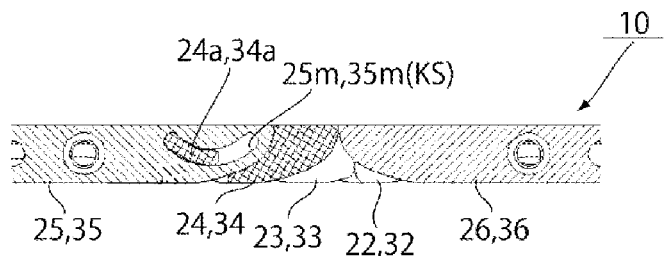
FIGS. 11A, 11B, 11C, 11D and 11E show respective cross sections of coupling portions at an opening angle of 180 degree; where
Figure 11B:
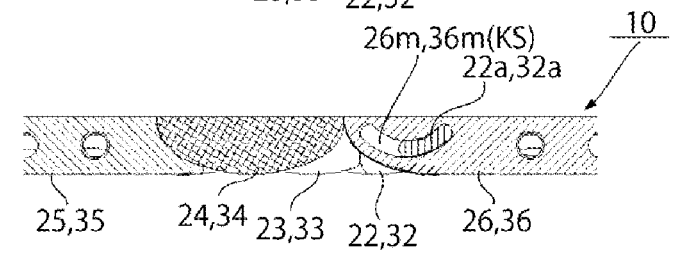
Figure 11C:
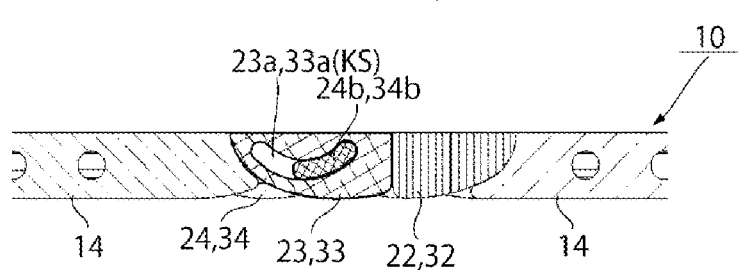
Figure 11D:
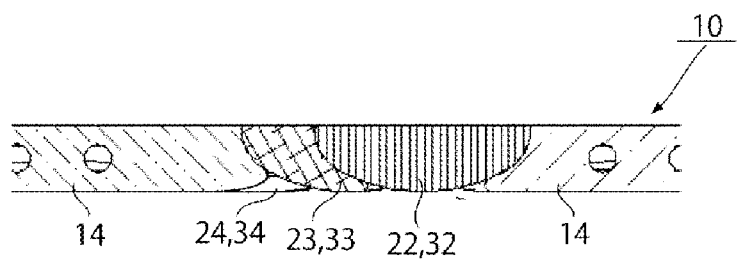
Figure 11E:
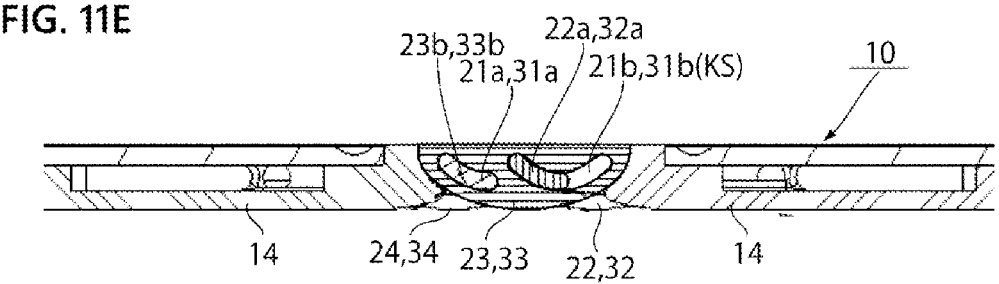

As shown in FIGS. 9C, 10C and 11C, short arc convex portions 24*b*, 34*b* of link members 24, 34 are loosely fitted into long arc grooves 23*a*, 33*a* of central members 23, 33, so that these link members are slidable with rotation relative to the central members 23, 33. As shown in FIGS. 9E, 10E and 11E, short arc convex portions 22*b*, 32*b* of link members 22, 32 are loosely fitted into long arc grooves 21*b*, 31*b* of central members 21, 31, so that these link members are slidable with rotation relative to the central members 21, 31. The central members 23, 33 are fixed to central members 21, 31, by loosely fitting arc convex portions 23*b*, 33*b* into arc grooves 21*a*, 31*a* of the central members 21, 31.

(Cross Sections of Friction Generating Portions for Different Opening Angles)

Figure 12A:
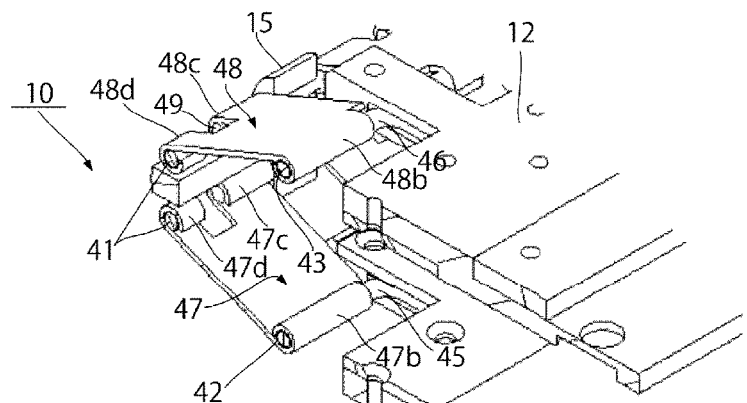
FIGS. 12A, 12B, 12C and 12D show respective cross sections of a friction generating portion at an opening angle of 0 degree; where
Figure 12B:
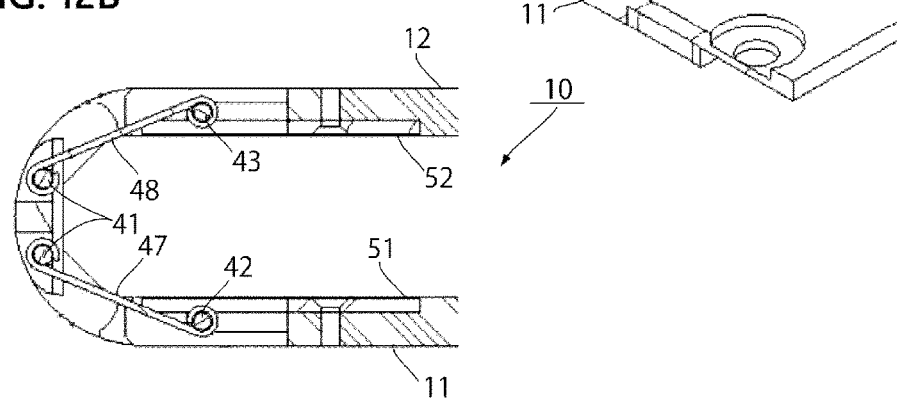
Figure 12C:
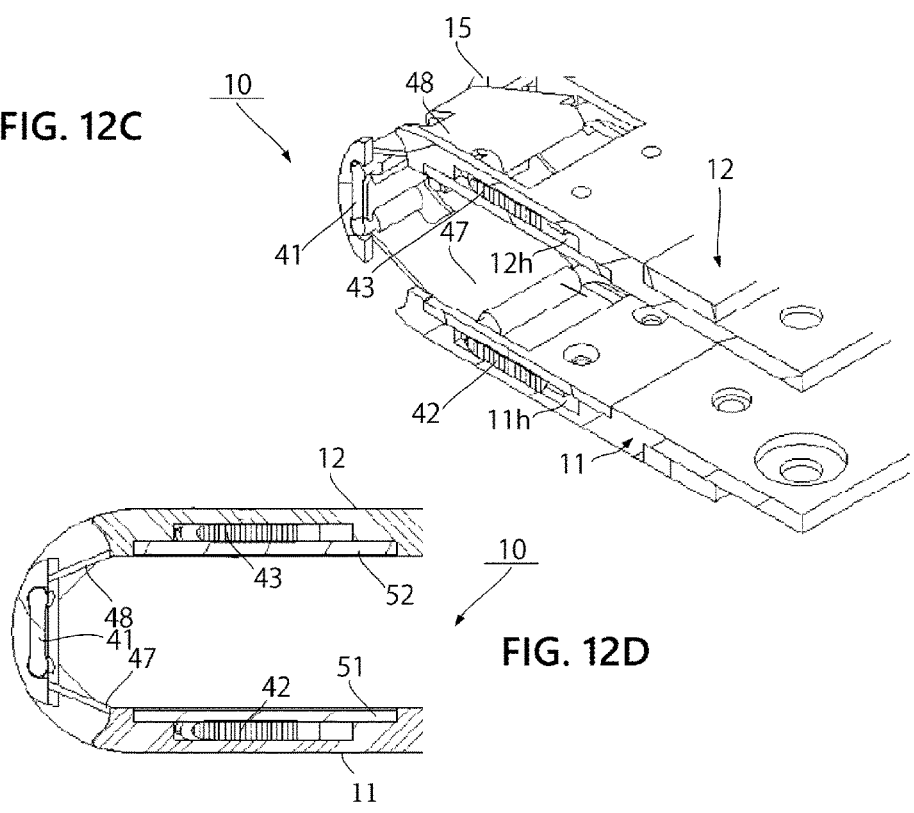
Figure 12D:
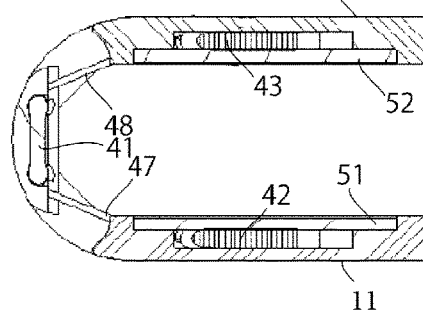
Figure 13A:
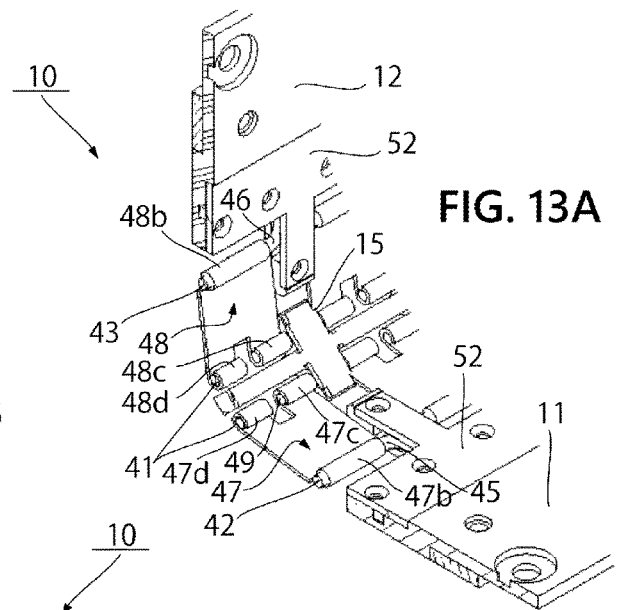
FIGS. 13A, 13B, 13C and 13D show respective cross sections of a friction generating portion at an opening angle of 90 degree; where
Figure 13B:
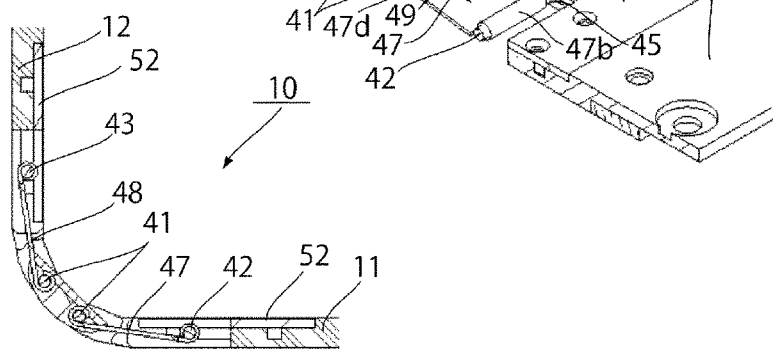
Figure 13C:
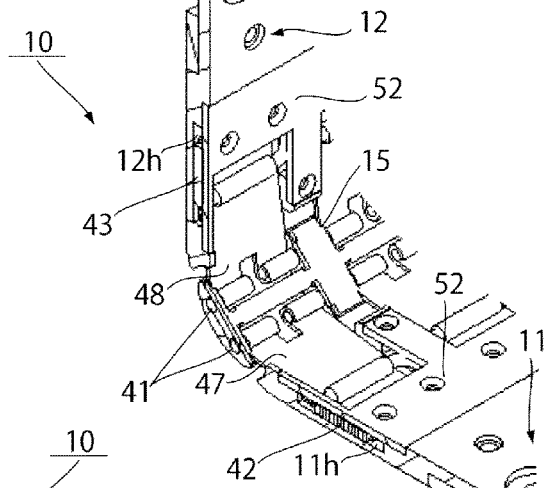
Figure 13D:
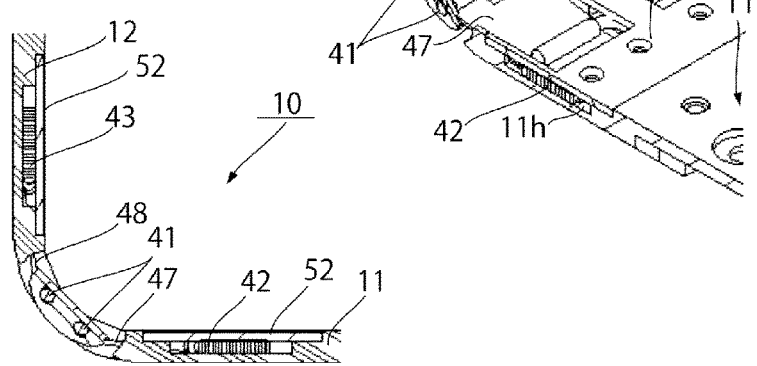
Figure 14A:
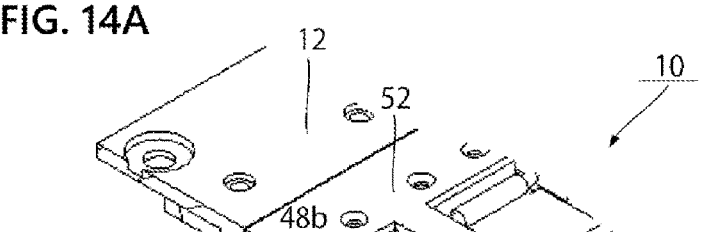
FIGS. 14A, 14B, 14C and 14D show respective cross sections of a friction generating portion at an opening angle of 180 degree; where
Figure 14B:
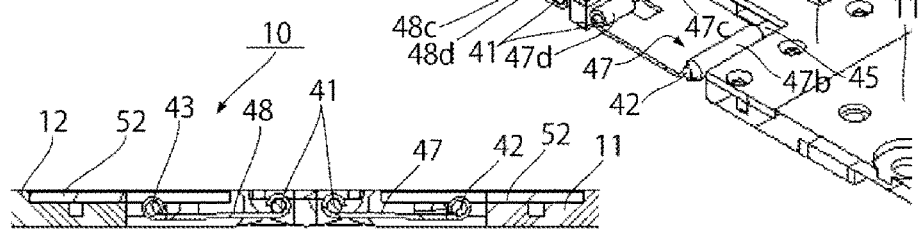
Figure 14C:
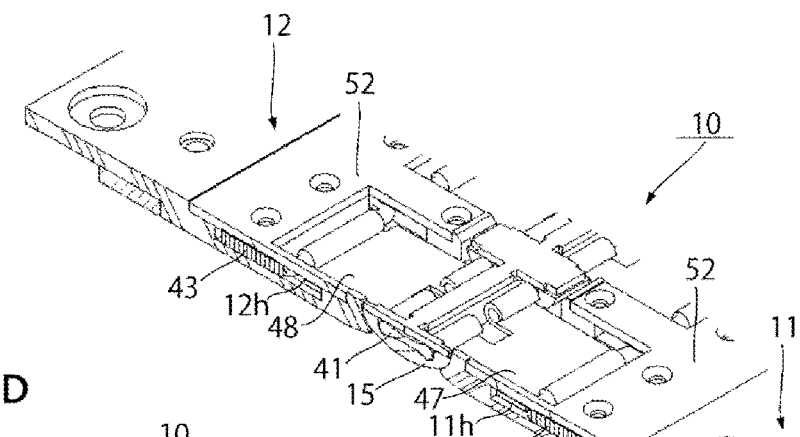
Figure 14D:
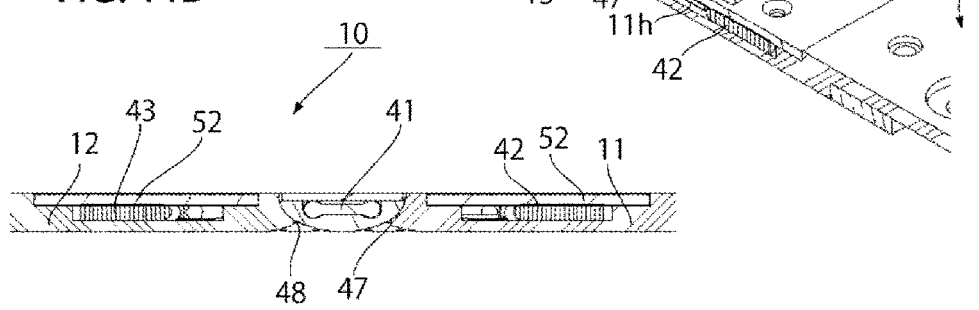

FIGS. 12A, 12B, 12C and 12D show respective cross sections of a friction generating portion at an opening angle of 0 degree. FIGS. 13A, 13B, 13C and 13D show respective cross sections of a friction generating portion at an opening angle of 90 degrees. FIGS. 14A, 14B, 14C and 14D show respective cross sections of a friction generating portion at an opening angle of 180 degrees. In FIGS. 12A to 14D, FIGS. 12A, 13A, 14A show a perspective view on an F-F cross section, FIGS. 12B, 13B, 14B show an F-F cross section, FIGS. 12C, 13C, 14C show a perspective view on a G-G cross section, and FIGS. 12D, 13D, 14D show a G-G cross section.

As shown in FIG. 8, cross sections are defined for different positions A to E of friction generating portions; then cross sections for different opening angles are shown in FIGS. 12A to 14D. As shown in FIGS. 12A to 14A, a U-shaped shaft 41 is held by interference-fit by end portions 47*d*, 48*d* of friction bearings 47, 48 to generate a friction with the friction bearings 47, 48. A U-shaped shaft 49 is held by interference-fit by end portions 47*c*, 48*c* of friction bearings 47, 48 to generate a friction with the friction bearings 47, 48. This arrangement secures a resistance against a force for rotating the friction bearings 47, 48 relative to a central block 15, that is a force for rotating an attaching member 11 relative to a central block 15.

L-shaped shafts 42, 45 are held by interference-fit by end portions 47*b* of friction bearings 47 to generate a friction with the friction bearings 47. L-shaped shafts 43, 46 are held by interference-fit by end portions 48*b* of friction bearings 48 to generate a friction with the friction bearings 48. This arrangement secures a resistance against a force for rotating the friction bearings 47, 48 relative to attaching members 11, 12, that is a force for rotating an attaching member 11 relative to a central block 15.

Therefore, to change opening angles of the attaching member 11 and the attaching member 12, it is necessary to overcome frictions of end portions 47*b*, 47*c*, 47*d*, 48*b*, 48*c*, 48*d* of the friction bearings 47, 48 and to rotate U-shaped shafts 41, 49 and L-shaped shafts 42, 43, 45, 46. Accordingly, an opening and closing device 10 is held at any opening angle in a range of 0 to 180 degrees of an opening angle of an attaching member 11 and an attaching member 12.

To prevent an organic EL panel 105 disposed on the inner surface of an opening and closing device 10 from being drawn or compressed, as accompanied by opening and closing of the opening and closing device 10, envelop surfaces inside a plurality of link members (21, 23, 22, 24, 25, 26; 31, 33, 32, 34, 35, 36) formed on the inner surface of the opening and closing device 10 preferably have a constant length in a bending direction as accompanied by opening and closing of an opening and closing device 10. The opening and closing device 10 uses no hinge shafts for coupling adjacent link members, and generates a relative rotation between adjacent link members by sliding arc convex portions as guided in long arc grooves; in this manner, it forms on its inside envelop surfaces having a constant length in a circumferential direction. Furthermore, as shown in FIGS. 12A, 12B, 12C, 12E, the opening and closing device 10 is configured to be opened to 0 degree, when arc convex portions knock against one end portions of arc grooves. Still further, as shown in FIGS. 14A, 12B, 12C, 12E, the opening and closing device 10 is configured to be opened to 180 degrees, when arc convex portions knock against other end portions of arc grooves. A length of respective arc grooves are configured to rotate 180 degrees/4, that is 45 degrees, the arc convex portions to be inserted. Therefore, the arc grooves function as restricting means KS for restricting a rotation angle of adjacent link members within a predetermined range.

On the other hand, envelop surfaces along end portions 47*b*, 47*c*, 47*d*, 48*b*, 48*c*, 48*d* of the friction bearings 47, 48 are disposed outward of those formed on the inner surface of the opening and closing device 10, so that a length in a bending direction fluctuates as accompanied by an opening and closing of the opening and closing device 10.

Here, the end portions 47*b*, 47*c*, 47*d*, 48*b*, 48*c*, 48*d* of the friction bearings 47, 48 are fixed to a central block 15, so that they cannot move in a circumferential direction of their envelop surfaces. In this manner, the end portions 47*b*, 48*b* move relative to attaching members 11, 12, as accompanied by opening and closing of the opening and closing device 10, so that they follow a length of envelop surfaces along the friction bearings 47, 48. As stated above, an L-shaped shaft 42 slidably moves, so as to restrict its own rotation by a space 11*h* arranged between an attaching member 11 and a plate 51. An L-shaped shaft 43 slidably moves, so as to restrict its own rotation by a space 12*h* arranged between an attaching member 12 and a plate 52. As shown in FIGS. 12C, 13C and 14C, the L-shaped shafts 42, 43 slide in spaces 11*h*, 12*h* as accompanied by a rotation of central members 21, 31 relative to the attaching member 11.

Effects of Embodiment 1

In Embodiment 1, the link members 24, 34 are slidable with rotation relative to the attaching member 11. The link members 22, 32 are slidable with rotation relative to the attaching member 12. The central members 23, 33 and the central members 21, 31 couple the link members 24, 34 and the link members 22, 32. One end portions of the central members 21, 31 are slidable relative to the link members 24, 34 with rotation, and their other end portion are slidable relative to the link members 22, 32 with rotation. In this manner, the centers of relative rotation for the adjacent link members can take positions on the inner surfaces of the link members. In the meantime, though a bending surface formed on the inner surface of the opening and closing device has a cylindrical shape from a viewpoint of technical concept, it has actually a prism shape. The envelop surfaces of a plurality of link members are actually not cylindrical surfaces, but elliptically cylindrical or substantially cylindrical surfaces. The centers of rotation for the adjacent link members are actually slightly away from the inner surfaces of the link members.

In Embodiment 1, friction generating portions 40 couple an attaching member 11 and the central members 21, 31, and apply a resistance force against a rotation of the central members 21, 31 relative to the attaching member 11. The friction generating portions 40 couple an attaching member 12 and the central members 21, 31, and apply a resistance force against a rotation of the central members 21, 31 relative to the attaching member 12. In this manner, the opening and closing device 10 can maintain the opening angle by the resistance force. Furthermore, to resist against a rotation of one link member and the one next to the next, the adjacent link members can be smoothly rotated, so that the entire structure formed by coupled link members can smoothly form and release from a bending. Still further, the opening and closing device 10 exhibits no disadvantage due to shape-memory alloy as is used in the reinforced beam made of shape-memory alloy as disclosed in JP Laid-Open Patent Application No. 2014-161009. Since the bent state in the bellows structure is not maintained by the plastic deformation of the reinforced beam, the backlash of shape-memory alloy is not an obstacle to setting the opening angle of the first casing 101 and the second casing 102. Still further, the reinforced beam made of shape-memory alloy is not plastically deformed at every opening and closing, so there is no limitation to the number of repetitions. Still further, no shape-memory alloy is used here, so material cost for the opening and closing device 10 is reduced.

In Embodiment 1, the end portions 41*a*, 49*a* of the U-shaped shafts 41, 49 are provided on the central members 21, 31 so as to control a rotation relative to the central members 21, 31. Each of the friction bearings 47 has one end portion 47*b* attached to an attaching member 11, and other end portions 47*c*, 47*d* fitted onto the U-shaped shafts 41, 49 to apply friction force being a resistance force. In Embodiment 1, the end portions 41*a*, 49*a* of the U-shaped shafts 41, 49 are provided on the central members 21, 31 so as to control a rotation relative to the central members 21, 31. Each of the friction bearings 48 has one end portion 48*b* attached to an attaching member 12, and other end portions 48*c*, 48*d* fitted onto the U-shaped shafts 41, 49 to apply friction force being a resistance force. The end portions 42*a*, 45*a* of the L-shaped shafts 42, 45 being examples of fifth friction members are provided on the attaching member 11 so as to restrict a rotation relative to the attaching member 11, and fitted into the end portion 47*b* of the friction bearing 47 to apply a friction force being a resistance force. The end portions 43*a*, 46*a* of the L-shaped shafts 43, 46 being examples of fifth friction members are provided on the attaching member 12 so as to restrict a rotation relative to the attaching member 12, and fitted into the end portion 48*b* of the friction bearing 48 to apply a friction force being a resistance force. In this manner, it is possible to use simple and small-sized components such as U-shaped shafts, L-shaped shafts and friction bearings to structure friction generating portions 40.

In Embodiment 1, the end portions 42*a*, 45*a* of the L-shaped shafts 42, 45 slide along the attaching member 11 as accompanied by a rotation of central members 21, 31 relative to the attaching member 11. The end portions 43*a*, 46*a* of the L-shaped shafts 43, 46 slide along the attaching member 12 as accompanied by a rotation of central members 21, 31 relative to the attaching member 12. In this manner, the L-shaped shafts 42, 43, 45, 46 do not slide as accompanied by opening and closing of the opening and closing device 10 to prevent the opening and closing device 10 from opening and closing.

In Embodiment 1, the end portions 41*a*, 49*a* of the U-shaped shafts 41, 49 and the end portions 41*b*, 49*b* of the U-shaped shafts 41, 49 are respectively composed of the U-shaped shafts 41, 49 being single pieces. The end portions 41*a*, 49*a* of the U-shaped shafts 41, 49 and the end portions 41*b*, 49*b* of the U-shaped shafts 41, 49 are respectively composed of parts in parallel facing each other of the metal wire bent in U shape. In this manner, the U-shaped shafts 41, 49 are fixed to the central members 21, 31 to restrict a rotation of cross sections of the U-shaped shafts 41, 49 and to generate a friction with the friction bearings 47, 48.

In Embodiment 1, the friction bearings 47, 48 are composed of elastic plate materials, wherein their respective cross sections are bent so as to pinch cross sections of the metal wire. In this manner, the structure of the friction generating portions 40 is simplified, so that it is possible to form them with a reduced number of parts. In Embodiment 1, in the friction generating portions 40, the first friction generating means and the second friction generating means are integrally coupled on a central block 15, by the U-shaped shafts 41, 49. In this manner, the total number of parts is reduced for the first friction generating means and the second friction generating means.

In Embodiment 1, a plurality of sets of the friction generating portions 40 are disposed between a pair of the coupling portions 20, 30, wherein each of the coupling portions is composed of an attaching member 11, link members 24, 34, an attaching member 12, link members 22, 32 and a central block 15. In this manner, differences in resistance between the first friction generating means and the second friction generating means are reduced by measuring a resistance each of a plurality of sets of the friction generating portions and then combining these.

Embodiment 2

In Embodiment 1, a combination an arc groove formed on one of adjacent link members and an arc convex portion formed on the other brings about a structure sliding with rotation. However, the structure sliding with rotation is not limited to a combination the arc groove and the arc convex portion. Even if the arc convex portions are replaced with a pair of pins disposed at positions corresponding to the end portions in a circumferential direction, it is possible to realize a relative movement between adjacent link members as in Embodiment 1. An arc-shaped rail can be provided on one of the adjacent link members, and two pairs of rollers on the other of the adjacent link members. In the meantime, a sliding movement with rotation is equivalent to a rotating movement with sliding.

Embodiment 3

In Embodiment 1, a resistance force is applied to a relative rotation of two link members over another one located between both by an interference-fit of a pin having a circular cross section and a circular hole. However, a structure for applying a resistance force to a relative rotation of two link members over another one located between both is not limited to an interference-fit of a pin having a circular cross section and a circular hole. Friction bearings equal to the ones in Embodiment 1 can be also disposed on a central block 15 and attaching members 11, 12, and these three friction bearings can be coupled to each other using U-shaped shafts as in Embodiment 1. Here, it is preferable to provide the friction bearings disposed on the attaching members 11, 12 such that they are movable along the attaching members 11, 12.

Embodiment 4

In Embodiment 1, friction generating portions are formed of L-shaped shafts and U-shaped shafts, both made of a metal wire, as well as of friction bearings made of an elastic metal plate with its ends being curled. However, combinations of components and shapes on the insertion side and on the side undergoing an insertion are not limited to that in Embodiment 1. Various combinations of materials which can generate a stable frictional relative movement between the insertion side and the side undergoing the insertion can be selected. It is also possible that a friction bearing on the insertion side is made up of highly rigid material and the one on the side undergoing an insertion of a material with an elastically shrinkable diameter.

Embodiment 5

In Embodiment 1, friction generating portions are assembled independently of a plurality of link members sliding with rotation to be integrally detachable from a plurality of the link members. However, a plurality of the link members and the friction generating portions can be also assembled with parts at least partially in common. For example, circular holes for interference-fit can be also provided, wherein shaft portions of U-shaped and L-shaped shafts are inserted into the circular holes.

Embodiment 6

In Embodiment 1, a plurality of friction generating portions 40 are all identical. However, it is also possible that a plurality of friction generating portions 40 have resistance forces different in quantity or quality. As per quantity of resistance forces, it is conceivable that a plurality of types of friction generating portions with different sizes of their friction resistances are arranged, and two each of the plurality of types of friction generating portions are combined, such that respective sizes of their friction resistances lie within a predetermined range. As per quality of resistance forces, it is conceivable that friction generating portions are provided such that resistance forces generated with regard to rotation fluctuate depending on an opening angle, and they take the maximum at a predetermined opening angle, and the minimum at some intermediate angle.

For example, an opening and closing device of a laptop PC for coupling a display casing and a main body casing comprises friction generating portions (also referred to as drawing mechanism) with resistance forces generated with regard to rotation being minimum at opening angles of 0 degree and 90 degrees. Concretely, pins or cams having regular polygon cross sections are arranged instead of circular cross sections, and holes of resin material having regular polygon cross sections instead of friction bearings with metal plate end portions being curled. Then, fluctuations in rotation resistance when the pins having regular polygon cross sections rotate in the holes having regular polygon cross sections are utilized. The resistance to relative rotation takes the minimum at angles at which vertices of regular polygon cross sections meet, and it takes the maximum between these angles. Or otherwise, a detent mechanism can be also used, wherein pins or cams having flat cross sections are sandwiched by elastic members having U-shaped cross sections to reduce a resistance to rotation with a phase difference of 180 degrees.

Further Embodiments

An opening and closing device according to the invention is not limited to specific structure and applications as described in foregoing embodiments. It can be also realized in other embodiments, in which a part or the whole of structure in foregoing embodiments is replaced by an equivalent structure. In foregoing embodiments, reference is made to an opening and closing device for a terminal device with an organic EL panel. However, an opening and closing device in foregoing embodiments can be also used in a terminal device with an LED panel. Instead of twofold, a threefold, fourfold, multifold bellows structure or so on can be also used. Terminal devices include a foldable TV set. The invention can be realized in an electrical device other than terminal device in which a flexible planar device not for displaying an image, e.g. touch panel, keyboard, or so on is folded and housed inside. It can be used in various equipment and containers, wherein a first casing and a second casing are coupled to each other by a plurality of the link members to form bent envelop surfaces on the inside.

Since the invention is constructed as described in the foregoing, it is suitably used both as an opening and closing device for a two-fold type terminal device, e.g. cellular phone, smartphone, notebook PC, tablet PC, game machine, display, sign board and so on, wherein a flexible display panel is arranged to cross a first casing and a second casing, and as a terminal device using such an opening and closing device.

What is claimed is:

1. An opening and closing device for openably and closably coupling a first casing and a second casing, and forming an arc-shaped cross section in a closed state to support a flexible display panel provided over both the first casing and the second casing, said opening and closing device comprising:
   a first attaching member capable of being fixed to said first casing;
   a first link member slidable relative to said first attaching member with rotation;
   a second attaching member capable of being fixed to said second casing;
   a second link member slidable relative to said second attaching member with rotation;
   a central member provided between said first link member and said second link member, with one end portion thereof being slidable relative to said first link member with rotation, and other end portion thereof being slidable relative to said second link member with rotation;
   first friction generating means provided between said first attaching member and said central member for applying a resistance force to a rotation of said central member relative to said first attaching member, and
   second friction generating means provided between said second attaching member and said central member for applying a resistance force to a rotation of said central member relative to said second attaching member.

2. The opening and closing device according to claim 1, said first friction generating means comprising:
   a first friction member provided on said central member so as to restrict a rotation thereof relative to said central member;

a second friction member, one end portion thereof attached to said first attaching member and other end portion thereof fitted into said first friction member to apply a friction force being said resistance force;

said second friction generating means comprising:

a third friction member provided on said central member so as to restrict a rotation thereof relative to said central member;

a fourth friction member, one end portion thereof attached to said second attaching member and other end portion thereof fitted into said third friction member to apply a friction force being said resistance force.

3. The opening and closing device according to claim 2, said opening and closing device comprising:

a fifth friction member provided on said first attaching member so as to restrict a rotation thereof relative to said first attaching member, and fitted into said one end portion of said second friction member to apply a friction force being said resistance force; and a sixth friction member provided on said second attaching member so as to restrict a rotation thereof relative to said second attaching member, and fitted into said one end portion of said fourth friction member to apply a friction force being said resistance force.

4. The opening and closing device according to claim 3, said fifth friction member being provided so as to be slidable along said first attaching member as accompanied by a rotation of said central member relative to said first attaching member, and said sixth friction member being provided so as to be slidable along said second attaching member as accompanied by a rotation of said central member relative to said second attaching member.

5. The opening and closing device according to claim 4, said first friction member and said third friction member being composed of a single element.

6. The opening and closing device according to claim 5, said first friction member and said third friction member being composed of parts facing each other in parallel of a metal wire bent in a U-shape.

7. The opening and closing device according to claim 6, said second friction member and said fourth friction member being composed of elastic plate materials, with respective cross sections thereof being bent so as to pinch cross sections of said first friction member and said third friction member of said metal wire.

8. The opening and closing device according to claim 1, said first friction generating means and said second friction generating means being integrally coupled on said central member.

9. The opening and closing device according to claim 8, a pair of coupling portions being provided, each coupling portion being composed of said first attaching member, said first link member said second attaching member and said second link member, and a plurality of sets of said first friction generating means and said second friction generating means integrally coupled on said central member being disposed between said coupling portions.

10. The opening and closing device according to claim 1, a convex portion provided on one of said first attaching member and said first link member being held in an arc groove provided on the other thereof, said first link member thereby being rotatable and slidable relative to said first attaching member, a convex portion provided on one of said second link member and said second link member being held in an arc groove provided on the other thereof, said second link member thereby being rotatable and slidable relative to said second attaching member, a convex portion provided on one of said first link member and said central member being held in an arc groove provided on the other thereof, said central member thereby being rotatable and slidable relative to said first link member, a convex portion provided on one of said second link member and said central member being held in an arc groove provided on the other thereof, said central member thereby being rotatable and slidable relative to said second link member, and both end portions of said arc groove also functioning as restricting means for restricting movement of said arc projection along said arc groove as accompanied by opening and closing.

11. An electrical equipment comprising:

a first casing;

a second casing;

an opening and closing device according to claim 1; and a bendable flexible display panel disposed on respective inner surfaces of said first casing, said second casing and said opening and closing device.

* * * * *